(12) United States Patent
Resconi et al.

(10) Patent No.: US 7,985,799 B2
(45) Date of Patent: Jul. 26, 2011

(54) POLYMERIZATION PROCESS FOR PREPARING POLYOLEFIN BLENDS

(75) Inventors: Luigi Resconi, Ferrara (IT); Daniele Bigiavi, Bologna (IT)

(73) Assignee: Basell Poliolefine Italia s.r.l., Milan (IT)

( * ) Notice: Subject to any disclaimer, the term of this patent is extended or adjusted under 35 U.S.C. 154(b) by 201 days.

(21) Appl. No.: 11/919,852

(22) PCT Filed: May 8, 2006

(86) PCT No.: PCT/EP2006/062118
§ 371 (c)(1), (2), (4) Date: Nov. 2, 2007

(87) PCT Pub. No.: WO2006/120177
PCT Pub. Date: Nov. 16, 2006

(65) Prior Publication Data
US 2009/0043045 A1 Feb. 12, 2009

Related U.S. Application Data

(60) Provisional application No. 60/682,354, filed on May 18, 2005.

(30) Foreign Application Priority Data

May 11, 2005 (EP) .................... 05103955

(51) Int. Cl.
C08F 297/08 (2006.01)
C08F 10/00 (2006.01)
C08L 23/00 (2006.01)
(52) U.S. Cl. .................. 525/53; 525/191; 525/240
(58) Field of Classification Search .......... 525/240, 525/53, 191
See application file for complete search history.

(56) References Cited

U.S. PATENT DOCUMENTS

| | | | | |
|---|---|---|---|---|
| 3,634,546 A | * | 1/1972 | Hagemeyer et al. | 525/88 |
| 3,679,775 A | * | 7/1972 | Hagemeyer et al. | 525/268 |
| 3,954,697 A | * | 5/1976 | McConnell et al. | 526/348.3 |
| 4,178,272 A | * | 12/1979 | Meyer et al. | 525/210 |

(Continued)

FOREIGN PATENT DOCUMENTS
DE 19917985 10/2000
(Continued)

OTHER PUBLICATIONS

C. Carman et al., "Monomer Sequence Distribution in Ethylene-Propylene Rubber Measured by $^{13}$C NMR. 3. Use of Reaction Probability Model," *Macromolecules*, vol. 10(3), p. 536-544 (1977).

(Continued)

*Primary Examiner* — Mark Eashoo
*Assistant Examiner* — David Karst
(74) *Attorney, Agent, or Firm* — Dilworth IP LLC

(57) ABSTRACT

A process for preparing polyolefin blends comprising:
a) polymerizing in a solution phase propylene or 1-butene to prepare a polymeric solution containing a semicrystalline polymer component;
b) polymerizing in a solution phase 1-hexene or 1-octene to prepare a polymeric solution containing an amorphous polymer component;
c) mixing the polymeric solutions obtained from steps a) and b);
d) subjecting the mixture of step c) to a devolatilization step to separate a polyolefin blend comprising a semicrystalline component and an amorphous component;
the polymerization steps a) and b) being carried out in two polymerization reactors connected in parallel.

20 Claims, 2 Drawing Sheets

U.S. PATENT DOCUMENTS

Figure 1:
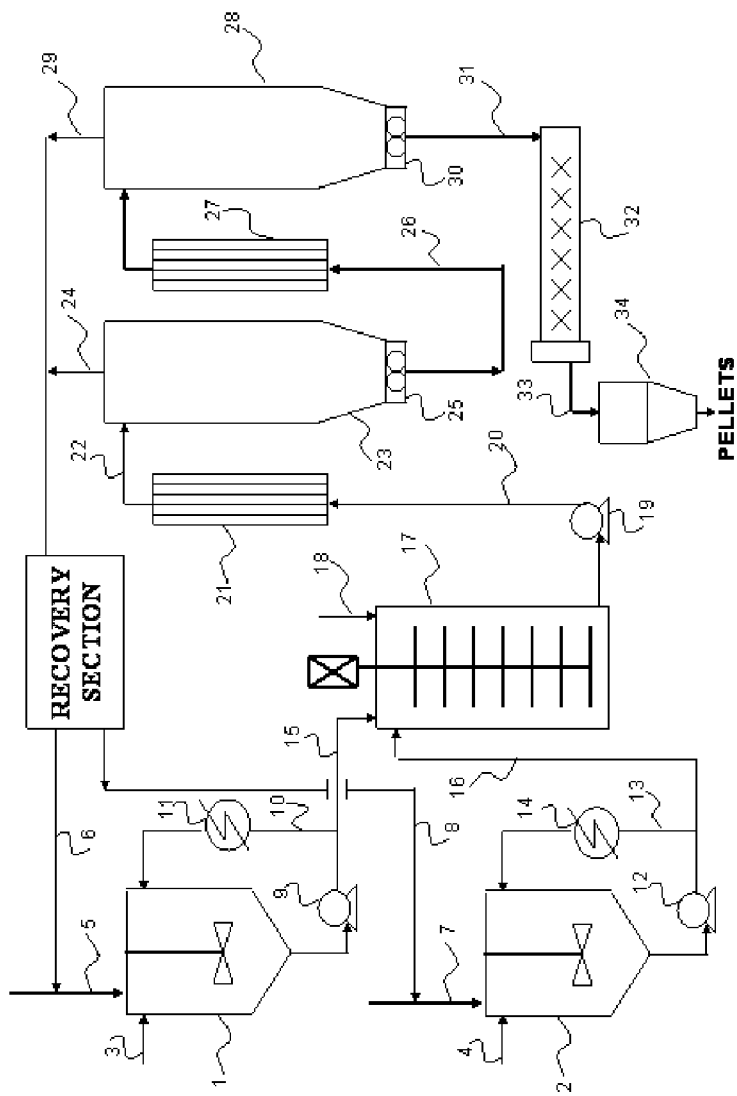

| | | | |
|---|---|---|---|
| 5,380,822 A * | 1/1995 | Skilbeck | 528/499 |
| 5,698,487 A | 12/1997 | Sacchetti et al. | |
| 5,770,664 A | 6/1998 | Okumura et al. | |
| 5,770,753 A | 6/1998 | Küber et al. | |
| 5,786,432 A | 7/1998 | Küber et al. | |
| 5,840,644 A | 11/1998 | Küber et al. | |
| 5,986,009 A * | 11/1999 | Thoen et al. | 525/232 |
| 6,051,727 A | 4/2000 | Küber et al. | |
| 6,207,756 B1 * | 3/2001 | Datta et al. | 525/191 |
| 6,242,544 B1 | 6/2001 | Küber et al. | |
| 6,255,506 B1 | 7/2001 | Küber et al. | |
| 6,306,996 B1 | 10/2001 | Cecchin et al. | |
| 6,399,533 B2 | 6/2002 | Sacchetti et al. | |
| 6,444,833 B1 | 9/2002 | Ewen et al. | |
| 6,492,539 B1 | 12/2002 | Bingel et al. | |
| 6,559,252 B1 | 5/2003 | Horton et al. | |
| 6,608,224 B2 | 8/2003 | Resconi et al. | |
| 6,635,779 B1 | 10/2003 | Ewen et al. | |
| 6,841,501 B2 | 1/2005 | Resconi et al. | |
| 6,878,786 B2 | 4/2005 | Resconi et al. | |
| 6,949,614 B1 | 9/2005 | Schottek et al. | |
| 6,953,829 B2 | 10/2005 | Kratzer et al. | |
| 6,963,017 B2 | 11/2005 | Bingel et al. | |
| 7,038,070 B2 | 5/2006 | Bingel et al. | |
| 7,053,160 B1 | 5/2006 | Bingel et al. | |
| 7,101,940 B2 | 9/2006 | Schottek et al. | |
| 7,112,638 B2 | 9/2006 | Nifant'ev et al. | |
| 7,141,527 B1 | 11/2006 | Van Baar et al. | |
| 7,141,637 B2 | 11/2006 | Elder et al. | |
| 7,199,163 B2 | 4/2007 | Bigiavi et al. | |
| 7,314,903 B2 | 1/2008 | Resconi et al. | |
| 2002/0072561 A1 * | 6/2002 | Johoji et al. | 524/505 |
| 2003/0149199 A1 | 8/2003 | Schottek et al. | |
| 2004/0024146 A1 * | 2/2004 | Friedersdorf | 526/82 |
| 2004/0081795 A1 * | 4/2004 | Wang et al. | 428/114 |
| 2004/0132612 A1 | 7/2004 | Resconi et al. | |
| 2004/0158000 A1 * | 8/2004 | Yada et al. | 525/240 |
| 2006/0020096 A1 | 1/2006 | Schottek et al. | |
| 2006/0052553 A1 | 3/2006 | Resconi et al. | |
| 2006/0183861 A1 * | 8/2006 | Harrington et al. | 525/191 |
| 2006/0235173 A1 | 10/2006 | Resconi | |
| 2007/0155919 A1 | 7/2007 | Okumura et al. | |
| 2007/0260023 A1 | 11/2007 | Jones et al. | |
| 2007/0276095 A1 | 11/2007 | Resconi et al. | |

FOREIGN PATENT DOCUMENTS

| | | |
|---|---|---|
| DE | 19962814 | 6/2001 |
| DE | 19962910 | 7/2001 |
| EP | 172961 | 3/1986 |
| EP | 576970 | 1/1994 |
| EP | 633272 | 1/1995 |
| EP | 775707 | 5/1997 |
| EP | 938491 | 9/1999 |
| GB | 1575894 | 10/1980 |
| JP | 4016851 | 1/1992 |
| JP | 4016853 | 1/1992 |
| JP | 4016854 | 1/1992 |
| JP | 4031868 | 2/1992 |
| WO | 91/02012 | 2/1991 |
| WO | 92/00333 | 1/1992 |
| WO | 95/32995 | 12/1995 |
| WO | 98/40331 | 9/1998 |
| WO | 99/21899 | 5/1999 |
| WO | 99/45043 | 9/1999 |
| WO | 00/31090 | 6/2000 |
| WO | 01/21674 | 3/2001 |
| WO | 01/44318 | 6/2001 |
| WO | 01/47939 | 7/2001 |
| WO | 01/48034 | 7/2001 |
| WO | 01/62764 | 8/2001 |
| WO | 02/102811 | 12/2002 |
| WO | 03/045964 | 6/2003 |
| WO | 03/050131 | 6/2003 |
| WO | WO 2004000891 A1 * | 12/2003 |
| WO | 04/005360 | 1/2004 |
| WO | 04/050724 | 6/2004 |
| WO | 04/099269 | 11/2004 |
| WO | 05/023889 | 3/2005 |
| WO | 05/058916 | 6/2005 |
| WO | 05/095468 | 10/2005 |
| WO | 05/095473 | 10/2005 |
| WO | 05/095474 | 10/2005 |
| WO | 05/118654 | 12/2005 |
| WO | 06/097497 | 9/2006 |
| WO | 06/097500 | 9/2006 |
| WO | 06/100258 | 9/2006 |
| WO | 06/100269 | 9/2006 |
| WO | 06/117285 | 11/2006 |

OTHER PUBLICATIONS

M. Kakugo et al., "$^{13}$C NMR Determination of Monomer Sequence Distribution in Ethylene-Propylene Copolymers Prepared with δ-TiCl$_3$-Al(C$_2$H$_5$)2Cl," *Macromolecules*, vol. 15(4), p. 1150-1152 (1982).

A. Rossi et al., "End Groups in 1-Butene Polymerization via Methylaluminoxane and Zirconocene Catalyst," *Macromolecules*, vol. 28(6), p. 1739-1749 (1995).

N. Naga et al., "Effect of co-catalyst system on α-olefin polymerization with *rac* - and *meso*- [dimethylsilylenebis(2,3,5-trimethyl-cyclopentadienyl)]zirconium dichloride," *Macromol. Rapid Commun.*, vol. 18, p. 581-589 (1997).

L. Resconi et al., "C$_1$-Symmetric Heterocyclic Zirconocenes as Catalysts for Propylene Polymerization, 2; *ansa*-Zirconocenes with Linked Dithienocyclopentadienyl-Substituted Indenyl Ligands," *Macromol. Chem. Phys.*, vol. 206, p. 1405-1438 (2005).

C. Cobzaru et al., "Novel High and Ultrahigh Molecular Weight Poly(propylene) Plastomers by Asymmetric Hafnocene Catalysts," *Macromol. Chem. Phys.*, vol. 206, p. 1231-1240 (2005).

L. Resconi et al., "Selectivity in Propene Polymerization with Metallocene Catalysts," *Chem. Rev.*, vol. 100(4), p. 1253-1345 (2000).

* cited by examiner

POLYMERIZATION PROCESS FOR PREPARING POLYOLEFIN BLENDS

The present invention relates to polyolefin blends containing a semicrystalline component and an amorphous component and a polymerization process for preparing these polyolefin blends. In particular, the present invention relates to a solution polymerization process for preparing polyolefin blends containing a 1-hexene or 1-octene (co)polymer as the amorphous component.

It is known that polyolefin blends, such as polyethylene blends or polypropylene blends, find a large field of industrial applicability. For instance, bimodal polyethylene blends can be advantageously used in the production of pressure pipes for conveying gas, drinking water and waste water. Heterophasic propylene copolymers, which are blends of a semicrystalline propylene homopolymer with an amorphous ethylene-propylene copolymer, are particularly suitable for producing items endowed with a high balance of stiffness and impact resistance: these mechanical properties are particularly noteworthy in the automotive industry to produce interior trims and bumpers.

The most common process for preparing polyolefin blends involves the intimate mixing of the individual polymeric components by means of melt extrusion in an extruder or kneader. According to this technique, the individual polymeric components of the blend are separately obtained and discharged as a polymer powder from the polymerization reactors. The solid polymer granules are then fed to an extruder or kneader, where they are subjected to heating and melting to favour their physical blending inside the extruder or kneader. Of course, an intensive and energetic mixing action is required to achieve the mutual dispersion of a first polymer component in a second component, so as to obtain the desired polymeric blends. A disadvantage of this technique is due to the fact that generally the melt viscosities of the individual polymer components to be blended are remarkably different, as in the case of a high molecular-weight ethylene copolymer and a low molecular-weight ethylene copolymer: it is therefore particularly difficult mixing the two components in a homogeneous way. In addition, the high temperatures generally required during the mixing phase can thermally degrade one of the polymer components: for instance, the high molecular-weight polyethylene component can be easily degraded by thermal stress or by shear forces in the extruder, thus impairing the final properties of the blend.

As an example of the above method, the disclosure of U.S. Pat. No. 6,545,093 describes a process for preparing a bimodal polyethylene blend which comprises separately feeding a high molecular weight ethylene copolymer and a low molecular weight ethylene homo- or copolymer into a mixing apparatus, melting both the components, homogenizing them, and discharging them via a gear pump from the mixing apparatus. Single- or twin-screw extruders or kneaders, Ko-kneaders or continuous kneaders, are cited as the preferred mixing apparatuses. The polymeric blend discharged from the mixing apparatus is successively fed to a pelletization device for the formation of polymer pellets.

A well-known alternative process for the preparation of polymer blends is referred to as the "in situ blending of polymers", which allows avoiding the disadvantages associated with the above described physical blending. According to this technique, a first polymer component is prepared in a first polymerization reactor and the obtained polymer granules are then transferred to a second polymerization reactor where a second polymer component is prepared: polymer blends are therefore prepared by means of a sequential polymerization in one or more reactors arranged in series. As a consequence, the mixing of polymer components of different molar mass distribution and/or chemical composition takes place within the polymer granules during the polymerization stage. Eventually, the multistage polymerization process can be operated by feeding different catalytic systems in each polymerization reactor.

As an example of the above technique, when aimed to prepare polypropylene blends, the semicrystalline component (propylene homopolymer) can be formed in a first polymerization reactor, while the elastomeric component (propylene-ethylene copolymer) can be prepared in a second reactor. Using this sequence of two polymerization reactors arranged in series and tailoring the process conditions, it is possible to produce a wide range of heterophasic propylene copolymers, as well as different concentrations of semicrystalline component and amorphous component. In fact, each reactor can work at different polymerization conditions, in terms of catalyst, pressure, temperature, amounts of comonomer(s) and molecular weight regulator(s).

In recent times an increasing industrial interest has been addressed to soft polyolefin blends including a semicrystalline component and an amorphous one, such as blends of isotactic and atactic polypropylene or blends including isotactic and atactic polybutene. The descriptions of U.S. Pat. Nos. 5,516,848 and 5,539,056 relate to the in situ preparation of polypropylene blends comprising a high molecular weight amorphous polypropylene and a low molecular weight isotactic polypropylene. For certain applications there is the need of using softer polyolefin compositions: the blending of a semicrystalline polyolefin component with an amorphous polymer component improves the aesthetic aspect of the final resin or certain mechanical properties, such as the elastic modulus, so that the material can be subjected to extrusion, injection molding, slush molding or rotor molding.

The major limit of the above softer polyolefin compositions is the relatively high glass transition temperature (Tg) of the amorphous component, i.e. the atactic polypropylene or the atactic polybutene component: this represents a limitation to the technical applicability of these polyolefin blends at low temperatures (particularly below 0° C.).

A solution to the above limitation could be replacing the amorphous component in the blend by means of a poly-1-hexene or a poly-1-octene component. These are non-crystallizable, completely amorphous polyolefins characterized by a very low Tg (about −50° C.): the formed blends would thus retain this low transition temperature Tg, thus improving the mechanical properties of such blends at low temperatures.

However, the preparation of polymer blends containing a polyhexene or polyoctene as the amorphous component would run into many technical drawbacks, because the methods commonly exploited in the industrial preparation of polyethylene or polypropylene blends cannot be successfully applied to the production of polymer blends containing the above amorphous polyolefin component.

As regards the physical blending of the polymer components by melt extrusion in an extruder or kneader, this technique is not industrially feasible due to the high level of stickiness of a polymer component based on polyhexene or polyoctene, which being completely amorphous, cannot be handled and fed into the extruder in the required form of free-flowing powder.

As regards the "in situ blending" preparation by means of a sequential polymerization in one or more reactors arranged in series, also this route is not feasible in the preparation of polymer blends containing a 1-hexene or 1-octene (co)polymer component. On the one hand, sequential polymerization processes carried out in a gaseous phase are not technically feasible, since the above amorphous polyolefins are not obtainable in the form of free-flowing powder. On the other hand, solution or slurry polymerization processes carried out in serially connected reactors would fail in giving polyolefin blends containing both a semicrystalline component and a polyhexene component, owing to the relevant technical feature of directly introducing the polymeric slurry or solution coming from the 1$^{st}$ reactor into the successive polymerization reactor. In fact, the polymerization conditions in the 2$^{nd}$ reactor would result completely uncontrollable for the simultaneous presence in this reactor of the unreacted monomers of the semicrystalline component and the amorphous component.

In view of all these considerations, it is now particularly felt the need of providing an industrial process capable of successfully preparing polyolefin blends containing a semicrystalline component and a poly-1-hexene or poly-1-octene component as the amorphous component of the blend.

It is therefore a first object of the present invention a process for preparing polyolefin blends comprising:
a) polymerizing in a solution phase propylene or 1-butene, optionally in the presence of α-olefin comonomers of formula $CH_2=CHR$, where R is hydrogen or a hydrocarbon radical having 1-8 carbon atoms, to prepare a polymeric solution containing a semicrystalline polymer component;
b) polymerizing in a solution phase 1-hexene or 1-octene, optionally in the presence of α-olefin comonomers of formula $CH_2=CHR$, where R is hydrogen or a hydrocarbon radical having 1-8 carbon atoms, to prepare a polymeric solution containing an amorphous polymer component;
c) mixing the polymeric solutions obtained from steps a) and b);
d) subjecting the mixture of step c) to a devolatilization step to separate a polyolefin blend comprising a semicrystalline component and an amorphous component.
the polymerization steps a) and b) being carried out in two polymerization reactors connected in parallel. BRIEF DESCRIPTION OF THE SEVERAL VIEWS OF THE DRAWINGS F*igure* 1 is a process flow diagram of a polymerization process for producing polyolefin blends where material exiting stirred tank reactors 1 and 2 are routed to a mixing apparatus 17 prior to processing in heat exchanger 21 and first volatilizer 23.

F*igure* 2 is a process flow diagram of a polymerization process for producing polyolefin blends where material exiting stirred tank reactor 1 is routed to heat exchanger 35 and then first volatilizer 37, and material exiting stirred tank reactor 2 is routed to heat exchanger 46 and then first volatilizer 48.

According to the process of the present invention the polymerization steps a) and b) are carried out in a solution phase, so that a solution of a polymer in the reaction medium is obtained from the polymerization reactors. The reaction medium comprises the liquid monomers and optionally, depending on the α-olefin to be polymerized, an inert hydrocarbon solvent, which can be used to favor the solubility of the obtained polymer in the liquid medium.

The solution polymerization of steps a) and b) can be performed in the presence of high yield polymerization catalyst, which can be selected from a Ziegler-Natta or a single-site based catalyst system. It is preferred to carry out a pre-contact of the catalyst components in a pre-contacting pot. A transition metal compound, an aluminum alkyl compound and optionally an electron donor compound (only for a Ziegler-Natta catalyst) are brought into contact at a temperature lower than 60° C., preferably comprised between 0 and 40° C. The catalyst system formed in the pre-contacting pot is then transferred to the polymerization reactors of steps a) and b).

When a single-site catalyst is used as the polymerization catalyst, the catalyst system is preferably prepared as described in the patent Application PCT/EP2005/002479. Also catalyst systems of different species can be used in steps a) and b) according to the knowledge of the person skilled in the art.

The polymerization steps a) and b) may be carried out in a wide variety of reaction vessels, including continuously stirred tank reactors and static mixer reactors (SMR). Preferably, two continuously stirred tank reactors connected in parallel are used.

When a semicrystalline component is obtained from step a) by the solution polymerization of 1-butene, the liquid monomer is used as the reaction medium, optionally together with an inert hydrocarbon solvent. A polymerization in liquid 1-butene is the preferred one, without using any inert hydrocarbon solvent. The bulk polymerization is feasible since poly1-butene is dissolved in 1-butene at relatively low temperatures. Furthermore, the two components of the solution perfectly mix together at the optimum working temperatures of a Ziegler-Natta or a single-site catalyst system. In order to obtain the best performance of the polymerization catalyst together with a complete miscibility of monomer and polymer, the polymerization temperature in step a) is generally kept at a value comprised in the range of from 65 to 85° C., while the pressure is generally comprised between 8 and 40 bar. The residence time of the liquid inside the reactor is generally comprised between 30 minutes and 4 hours, preferably between 2 and 3 hours.

As an alternative, the semicrystalline component of step a) can be obtained by the polymerization of propylene. In this case, the solution polymerization of propylene is carried out in liquid monomer, preferably with the presence of a polymerization solvent selected from a paraffinic, isoparaffinic, naphtenic, or aromatic hydrocarbon solvent to foster the solubility of the obtained polymer. Suitable solvents are, for example, toluene, cyclohexane, hexane, heptane, octane, nonane, isooctane, ethylbenzene, isopentane and Isopar™, which is a $C_8$-$C_{10}$ hydrocarbon mixture. Depending on the selected solvent and catalyst system, the polymerization of propylene is generally operated at a high temperature, generally in a range from 80 to 200° C., preferably from 90 to 130°, and a high pressure, generally in a range from 15 to 100 bar, preferably from 20 to 50 bar. The residence time of the liquid inside the reactor is generally comprised between 10 minutes and 90 minutes, preferably between 20 minutes and 60 minutes.

The amorphous component of the polyolefin blend of the present invention is obtained by polymerizing 1-hexene or, alternatively 1-octene, in a solution phase (step b). The liquid monomer is used as the reaction medium, optionally together with an inert hydrocarbon solvent. A polymerization in the liquid monomer is the preferred one, without using any inert hydrocarbon solvent. The bulk polymerization is feasible since the obtained polyolefin is soluble in the 1-hexene or 1-octene monomer, even at relatively low temperatures and ambient pressure. In order to obtain the best performance of the polymerization catalyst together with a complete mutual miscibility of monomer and polyolefin, the polymerization temperature in step b) is generally kept at a value comprised in a range from 20° C. to 80° C. The residence time of the liquid inside the reactor is generally comprised between 30 minutes and 4 hours, preferably between 2 and 3 hours.

Different operative conditions can be adopted in the reactors of step a) and b), as regards the concentration of molecular weight regulator, monomer and optional comonomers. Hydrogen can be advantageously used to control the molecular weight of the obtained polymers.

Optionally the main monomer of step a) (1-butene or propylene) may be copolymerized with another α-olefin of formula $CH_2$=CHR, where R is hydrogen or a hydrocarbon radical having 1-8 carbon atoms in an amount up to 15% by weight, preferably 0.5-10% by weight, based on the main monomer. If the main monomer is propylene, the preferred comonomers are ethylene, 1-butene, 1-hexene and 1-octene. If the main monomer is 1-butene, the preferred comonomers are ethylene, propylene, 1-hexene and 1-octene.

Analogously, the main monomer of step b) (1-hexene or 1-octene) may be copolymerized with another α-olefin of formula $CH_2$=CHR, where R is hydrogen or a hydrocarbon radical having 1-8 carbon atoms in an amount up to 50% by weight based on the main monomers. If the main monomer is 1-hexene, the preferred comonomers are ethylene, propylene, 1-butene and 1-octene. If the main monomer is 1-octene, the preferred comonomers are ethylene, propylene, 1-butene and 1-hexene.

The above indicated ranges of polymerization temperature in step a) and b) must be maintained inside each reactor by means of a suitable cooling system. In order to balance the heat produced by the polymerization reaction, a heat exchange unit is placed along the recycle loop to each reactor. According to an embodiment, the polymeric solution can be withdrawn from the bottom of each stirred reactor by means of a suitable pump for high viscosity fluids, such as a gear pump or a screw pump, and then the major portion thereof is passed through a heat exchanger to remove the heat of reaction and returned to the reactor.

Highly viscous polymeric solutions are discharged from both the polymerization reactors of steps a) and b). The viscosity of the obtained polymeric solution should not exceed a threshold value, as otherwise it becomes extremely difficult stirring and/or processing the polymeric solutions downstream the polymerization section. The viscosity of the polymeric solutions is generally comprised between 1000 and 100000 centiPoises.

A polymeric solution containing a semicrystalline polymer component is continuously discharged from the reactor of step a), while a polymeric solution containing an amorphous polymer component is continuously discharged from the reactor of step b).

According to a first embodiment of the present invention, both these polymeric solutions are transferred to the mixing stage c), which can be performed in a mixing apparatus equipped with one or more stirring devices. Conventional mixers or static mixers can be used as the mixing apparatus of step c). If there is the need of adding the polymer solutions with particular additives, such as for instance catalyst deactivators, conventional mixers equipped with stirring devices are the preferred ones.

Due to the high viscosity of the polymeric solutions to be mixed, a vigorous and intimate mixing has to be performed for achieving an effective mutual dispersion of the semicrystalline polymer component and the amorphous component. Said vigorous stirring can be also pursued flowing the polymeric solutions through a sequence of mixing stages. The intimate contact and mixing of the polymer components can be improved by providing baffles along the walls of the mixing apparatus.

A homogeneous mixture of the two polymeric solutions is withdrawn from the mixing stage c) and passed to the separation step d), where unreacted monomers and the polymerization solvents, if present, are recovered and re-circulated to the polymerization reactors of steps a) and b).

According to the process of the present invention, the removal of the unreacted monomers and polymerization solvents is generally achieved by a melt devolatilization technique, which allows to separate, in the form of a "polymer melt", a polyolefin blend comprising the two polymerization components (a semicrystalline and an amorphous one).

The mixture of polymeric solutions coming from step c) is first subjected to heating in a heat exchanger to raise its temperature to values comprised between 180 and 300° C., this value of temperature being bound to the volatility of the specific monomers and solvents to be recovered. A multi-tube heat exchanger with static mixing elements inserted inside each tube can be used to this purpose. Said elements cause mixing between the outermost and the innermost veins of the flowing stream, thus favoring a good heat transfer between the different threads of fluid. As a consequence, a mixture of polymeric solutions having a homogenous distribution of temperature is obtained at the outlet of said heat exchanger before the feeding to the separation step d).

Step d) is carried out by means of one or more devolatilization chambers. Preferably, a sequence of a first and a second volatilizer operating at a decreasing pressure can be exploited. The first volatilizer can be operated at a pressure higher than the atmospheric pressure and the second one can be operated under vacuum: by this technique a polymer melt substantially free of monomers and polymerization solvents is obtained at the outlet of the second volatilizer.

According to the present invention the "polymer melt" which is obtained from step d) consists of a polyolefin blend in the molten state: in spite of its very high viscosity (of about $20 \times 10^6$ cP), said polymer melt is still able to flow as a fluid inside pipes and similar.

In particular, the homogeneous mixture of polymer solutions is introduced at the top of a first empty volatilizer, operated at a temperature of 180-300° C., preferably 200-250° C. and a pressure of 1-15 bar, preferably 2-12 bar. Due to their high volatility the unreacted monomers and optional polymerization solvents are separated from the polymeric components: the polymer melt settles downwards at the bottom of the volatilizer, while the unreacted monomers flow upward as a gaseous mixture. The gaseous mixture collected at the top of the first volatilizer can contain other volatile components, such as inert hydrocarbons, catalyst deactivators, etc so that the monomer recovery section requires the separation of said compounds from the unreacted monomers. The monomer recovery section comprises one or more distillation columns to separate the different monomers before the recycle to the polymerization reactors.

The polymer melt coming from the first volatilizer is introduced into a second devolatilization chamber, operated in the same range of temperature of the first volatilizer, but preferably under vacuum, at a pressure comprised between 5 and 100 mbar. As a consequence of said vacuum conditions a further content of unreacted monomers is released away during the drop and settling of the polymer melt inside the volatilizer, so that at the outlet of the second volatilizer the content of unreacted monomers and polymerization solvents in the polymer melt is reduced at values of less than 500 ppm weight.

The polymer melt collected at the bottom of each volatilizer is characterized by a very high viscosity, of about $20 \times 10^6$ cP. As a consequence, specific pumps, such as gear pumps, are preferably used to guarantee the extraction of the melt from the bottom of each devolatilization chamber.

As said, the polymer melt discharged from step d) is a polyolefin blend containing a semicrystalline component and an amorphous component. This polyolefin composition can be successively subjected to extrusion and underwater pelletization to obtain polymer pellets.

The process of the present invention will now be described in detail with reference to the enclosed FIG. 1, showing the first embodiment of the invention. The scheme of FIG. 1 has to be considered illustrative and not limitative of the scope of the invention.

The polymerization steps a) and b) are performed in two continuously stirred tank reactors 1 and 2, which are connected according to a parallel configuration.

A transition metal compound, optionally supported on a carrier, an aluminum alkyl compound and optionally an electron donor compound are first pre-contacted in one or more pre-contacting pots (not shown) and then fed to the continuously stirred tank reactors 1 and 2, respectively via line 3 and 4. If any, the catalyst systems fed to reactors 1 and 2 may belong to a different family of catalyst system.

A liquid stream containing liquid 1-butene or propylene, hydrogen and optional comonomers and hydrocarbon solvents is introduced in the reactor 1 via line 5. The monomers and optional solvents coming from the recovery section are recycled to the reactor 1 via line 6.

A liquid stream containing liquid 1-hexene or 1-octene, hydrogen and optionally comonomers is introduced in the reactor 2 via line 7. The main monomers and optional comonomers coming from the recovery section are recycled to the reactor 2 via line 8. The operating conditions in the two reactors are selected as above specified and a high-viscosity solution of polymer in the liquid monomer is formed in both the reactors 1 and 2.

A polymeric solution containing a semicrystalline component is withdrawn from the bottom of reactor 1 by means of a pump 9. A part of the polymeric solution is fed via line 10 to a heat exchanger 11 and then, after cooling, recycled to reactor 1. Analogously, a polymeric solution containing an amorphous component is withdrawn from the bottom of reactor 2 by means of a pump 12. A part of the polymeric solution is fed via line 13 to a heat exchanger 14 and then, after cooling, recycled to reactor 2.

The polymeric solutions discharged from the stirred tank reactors 1 and 2 are then transferred, respectively via lines 15 and 16 to the mixing apparatus 17 for carrying out the mixing stage c). Suitable additives, such as catalyst deactivators, may be fed via line 18 at the top of the mixer 17.

A homogeneous mixture of the two polymeric solutions is withdrawn from the mixer 17 by means of the pump 19, said mixture being conveyed via line 20 to the heat exchanger 21, where the temperature of said mixture is increased to high values for involving the separation of the unreacted monomers and polymerization solvents from the polymeric components in the successive step d). A multi-tube heat exchanger with static mixing elements inserted inside each tube may be used as the heat exchanger 21.

The homogeneous mixture of polymer solutions coming from the top of the heat exchanger 21 is successively introduced via line 22 at the top of a first volatilizer 23, operated under pressure. In said first volatilizer 23, the unreacted monomers and optional solvents are separated from the polymeric components: the polymer melt settles downwards at the bottom of the volatilizer, while the unreacted monomers flow upward as a gaseous mixture. The gaseous mixture collected at the top of the volatilizer 23 is passed via line 24 to the monomer recovery section and then returned as liquid monomers to the polymerization reactors via line 6 and 8.

The polymer melt is withdrawn by means of a gear pump 25 from the bottom of the first volatilizer 23 and introduced via line 26 into a second multi-tube heat exchanger 27. Afterwards, the polymer melt is fed at the top of a second volatilizer 28 wherein vacuum conditions are maintained. The gaseous mixture collected at the top of said second volatilizer 28 is sent via line 29 to the recovery section. The polymer melt withdrawn by means of a gear pump 30 from the bottom of the second volatilizer 28 is introduced via line 31 into a static mixer 32 to be subjected to extrusion. A side-arm extruder (not shown) can be used for melting and mixing the additives used for the compounding of the obtained polyolefin blend. The additived polyolefin blend exiting the static mixer 32 is then passed via line 33 to an underwater pelletizer 34 where it is cut into pellets.

According to a second and alternative embodiment of the present invention, the two polymer solutions when discharged from the reactors of steps a) and b) are not conveyed to a mixing stage, but are separately subjected to a devolatization step to obtain two separated polymer melts. The mixing stage is therefore placed downstream the devolatization section and involves the mixing of the two obtained polymer melts inside a kneader or similar apparatus suitable for blending highly viscous fluids.

It is therefore a second object of the present invention a process for preparing polyolefin blends comprising:

A) polymerizing in a solution phase propylene or 1-butene, optionally in the presence of α-olefin comonomers of formula $CH_2=CHR$, where R is hydrogen or a hydrocarbon radical having 1-8 carbon atoms, to prepare a polymeric solution containing a semicrystalline polymer component;

B) polymerizing in a solution phase 1-hexene or 1-octene, optionally in the presence of α-olefin comonomers of formula $CH_2=CHR$, where R is hydrogen or a hydrocarbon radical having 1-8 carbon atoms, to prepare a polymeric solution containing an amorphous polymer component;

E) subjecting the polymeric solution of step A) to a devolatilization step to separate said semicrystalline component as a first polymer melt;

F) subjecting the polymeric solution of step B) to a devolatilization step to separate said amorphous component as a second polymer melt;

G) mixing said first and second polymer melts to obtain a polyolefin blend containing a semicrystalline and an amorphous component;

the polymerization steps A) and B) being carried out in two polymerization reactors connected in parallel.

The polymerization steps A) and B) are performed according to the same operative conditions and technical devices already described in correlation with the first embodiment of the present invention.

The devolatization steps E) and F) may be carried out by means of one or more devolatilization chambers. Preferably, devolatization steps E) and F) are separately performed in a sequence of a first and a second volatilizer operating at a decreasing pressure. The first volatilizer can be operated at a pressure higher than the atmospheric pressure and the second one can be operated under vacuum.

In the above sequence of two volatizers the same ranges of temperature and pressure, as explained for the devolatilization step (d) of the first embodiment, can be adopted.

A first polymer melt containing the semicrystalline polymer component and substantially free of monomers, polymerization solvents is obtained from step E), while a second polymer melt containing the amorphous polymer component and substantially free of monomers is obtained from step F).

The mixing apparatus of step G) has to be suitable for blending highly viscous fluids and may be selected from kneaders, single- or twin-screw extruders, static mixer compounders.

The second embodiment of the present invention will be now described with reference to the enclosed FIG. 2, which has to be considered illustrative and not limitative of the scope of the invention.

Similarly to FIG. 1 the polymerizations step A) and B) are performed in two continuously stirred tank reactors 1 and 2, which are connected in parallel. The integers from 1 to 16 define the same process lines and devices as explained with reference to FIG. 1, their definition being therefore omitted.

The polymeric solution containing a semicrystalline polymer component is withdrawn from the stirred tank reactor 1 and conveyed via line 15 to a multi-tube heat exchanger 35. The polymeric solution coming from the top of the heat exchanger 35 is successively introduced via line 36 at the top of a first volatilizer 37, operated under pressure. The gaseous mixture collected at the top of the volatilizer 37 contains 1-butene or propylene, polymerization solvents, and is transferred via line 38 to the monomer recovery section.

Polymer melt is withdrawn by means of a gear pump 39 from the bottom of the first volatilizer 37 and introduced via line 40 into a second multi-tube heat exchanger 41. Afterwards, the polymer melt is fed at the top of a second volatilizer 42, wherein vacuum conditions are maintained. The gaseous mixture collected at the top of said second volatilizer 42 is sent via line 43 to the recovery section.

A first polymer melt containing the semicrystalline polymer component is withdrawn by means of a gear pump 44 from the bottom of the second volatilizer 42.

Analogously, the polymeric solution containing the amorphous component is withdrawn from the stirred tank reactor 2 and conveyed via line 16 to a multi-tube heat exchanger 46. The devolatilization step F) takes places in a sequence of two volatilizers 48 and 53 so that the integers from 46 to 55 in FIG. 2 have exactly the same meaning of the corresponding integers 35-44 relative to the devolatilization step E).

A second polymer melt containing the amorphous polymer component is withdrawn by means of a gear pump 55 from the bottom of the second volatilizer 53.

Said first and second polymer melts are conveyed, respectively via line 45 and line 56, to a static mixer compounder 57 having the function of carrying out the mixing stage G). A polyolefin blend containing a semicrystalline component and an amorphous component is withdrawn, in the form of a polymer melt, from the die plate 58.

A side-arm extruder (not shown) can be used for melting and mixing the additives used for the compounding of the obtained polyolefin blend. The additived polyolefin blend is then transferred via line 59 to an underwater pelletizer 60, where polyolefin pellets are formed.

Both the first and the second embodiment of the process of the invention allow the preparation of polyolefin blends having a particular composition and consequently particular mechanical properties.

A third object of the present invention is therefore to provide polyolefin blends comprising the following components:
(a) from 30 to 95% by weight of a semicrystalline polyolefin component selected from:
1-butene (co)polymers having a fusion enthalpy ΔH higher than 10 J/g;
propylene (co)polymers having a fusion enthalpy ΔH higher than 15 J/g;

(b) from 5 to 70% by weight of an amorphous component selected from 1-hexene (co)polymers, 1-octene copolymers.

The semicrystalline component (a) is preferably selected from:
homopolymers of 1-butene;
homopolymers of propylene;
copolymers of 1-butene with another α-olefin selected from ethylene, propylene and 1-hexene, said α-olefin being present in an amount up to 15% by weight, preferably 0.5-10% by weight, with respect to 1-butene;
copolymers of propylene with another α-olefin selected from ethylene, 1-butene and 1-hexene, said α-olefin being present in an amount up to 15% by weight, preferably 0.5-10% by weight, with respect to propylene.

Fusion enthalpy, determined by differential Scanning Calorimetry (DSC), is generally regarded as an index of tridimensional order in the solid state, i.e. an index of crystallinity. The above mentioned values of fusion enthalpy means that component a) is semicrystalline. Preferably, the fusion enthalpy of component (a) is higher than 15 J/g in case of a 1-butene (co)polymer, higher than 40 J/g in case of a propylene (co)polymer.

When the component (a) is a 1-butene (co)polymer, its melting point is generally higher than 70° C. When the component (a) is a propylene (co)polymer, its melting point is generally higher than 100° C.

The intrinsic viscosity (IV) measured in tetrahydronaphtalene (THN) at 135° C. is generally comprised between 0.5 dl/g and 5.0 dl/g, preferably between 1.0 dl/g and 3.0 dl/g.

Component (b) of the polyolefin blend is completely soluble in xylene at 0° C.: as a consequence, component (b) has a completely amorphous structure.

The amorphous component (b) is preferably selected from:
homopolymers of 1-hexene;
homopolymers of 1-octene;
copolymers of 1-hexene with another α-olefin selected from ethylene, propylene, 1-butene, 1-octene, said α-olefin being present in an amount up to 50% by weight with respect to 1-hexene;
copolymers of 1-octene with another α-olefin selected from ethylene, propylene, 1-butene, 1-hexene, said α-olefin being present in an amount up to 50% by weight with respect to 1-octene.

The intrinsic viscosity (IV) of component (b) measured in tetrahydronaphtalene (THN) at 135° C. is generally comprised between 0.5 dl/g and 5.0 dl/g, preferably between 1.0 dl/g and 3.0 dl/g.

The polyolefin blends of the present invention are suitable to be used in industrial applications, where good elastic properties are required at low temperatures, in particular at temperature lower than 0° C. The compositions can be used for producing items endowed with a high balance of stiffness and impact resistance. These mechanical properties are particularly noteworthy in the automotive industry to produce interior trims and bumpers.

The polymerization process of the present invention can be carried out in the presence of a highly active catalyst system of the Ziegler-Natta or metallocene type.

A Ziegler-Natta catalyst system comprises the catalysts obtained by the reaction of a transition metal compound of groups 4 to 10 of the Periodic Table of Elements (new notation) with an organometallic compound of group 1, 2, or 13 of the Periodic Table of element.

In particular, the transition metal compound can be selected among compounds of Ti, V, Zr, Cr, and Hf. Preferred compounds are those of formula $Ti(OR)_n X_{y-n}$ in which n is comprised between 0 and y; y is the valence of titanium; X is halogen and R is a hydrocarbon group having 1-10 carbon atoms or a COR group. Among them, particularly preferred are titanium compounds having at least one Ti-halogen bond such as titanium tetrahalides or halogenalcoholates. Preferred specific titanium compounds are $TiCl_3$, $TiCl_4$, $Ti(OBU)_4$, $Ti(OBu)Cl_3$, $Ti(OBu)_2Cl_2$, $Ti(OBu)_3Cl$.

Preferred organometallic compounds are the organo-Al compounds and in particular Al-alkyl compounds. The alkyl-Al compound is preferably chosen among the trialkyl aluminum compounds such as for example triethylaluminum, tri-isobutylaluminum, tri-n-butylaluminum, tri-n-hexylaluminum, tri-n-octylaluminum. It is also possible to use alkylaluminum halides, alkylaluminum hydrides or alkylaluminum sesquichlorides such as $AlEt_2Cl$ and $Al_2Et_3Cl_3$ optionally in mixture with said trialkyl aluminum compounds.

Particularly suitable high yield ZN catalysts are those wherein the titanium compound is supported on magnesium halide in active form which is preferably $MgCl_2$ in active form. Internal electron donor compounds can be selected among esters, ethers, amines, and ketones. In particular, the use of compounds belonging to 1,3-diethers, phthalates, benzoates and succinates is preferred.

In order to obtain a semicrystalline polymer component from the polymerization step a), it is necessary to use, besides the electron-donor present in the solid catalytic component, an external electron-donor (ED) added to the aluminium alkyl co-catalyst component or to the polymerization reactor. These external electron donors can be selected among alcohols, glycols, esters, ketones, amines, amides, nitriles, alkoxysilanes and ethers. The electron donor compounds (ED) can be used alone or in mixture with each other. Preferably the ED compound is selected among aliphatic ethers, esters and alkoxysilanes. Preferred ethers are the C2-C20 aliphatic ethers and in particular the cyclic ethers preferably having 3-5 carbon atoms, such as tetrahydrofurane (THF), dioxane.

Preferred esters are the alkyl esters of C1-C20 aliphatic carboxylic acids and in particular C1-C8 alkyl esters of aliphatic mono carboxylic acids such as ethylacetate, methyl formiate, ethylformiate, methylacetate, propylacetate, i-propylacetate, n-butylacetate, i-butylacetate.

The preferred alkoxysilanes are of formula $R_a^1R_b^2Si(OR^3)_c$, where a and b are integer from 0 to 2, c is an integer from 1 to 3 and the sum (a+b+c) is 4; $R^1$, $R^2$, and $R^3$, are alkyl, cycloalkyl or aryl radicals with 1-18 carbon atoms. Particularly preferred are the silicon compounds in which a is 1, b is 1, c is 2, at least one of $R^1$ and $R^2$ is selected from branched alkyl, cycloalkyl or aryl groups with 3-10 carbon atoms and $R^3$ is a $C_1$-$C_{10}$ alkyl group, in particular methyl. Examples of such preferred silicon compounds are methylcyclohexyldimethoxysilane, diphenyldimethoxysilane, methyl-t-butyldimethoxysilane, dicyclopentyldimethoxysilane. Moreover, are also preferred the silicon compounds in which a is 0, c is 3, $R^2$ is a branched alkyl or cycloalkyl group and $R^3$ is methyl. Examples of such preferred silicon compounds are cyclohexyltrimethoxysilane, t-butyltrimethoxysilane and thexyltrimethoxysilane.

Also metallocene-based catalyst systems can be used in the solution polymerization process of the invention and they comprise:
- at least a transition metal compound containing at least one π bond;
- at least an alumoxane or a compound able to form an alkylmetallocene cation; and optionally an organo-aluminum compound.

Semicrystalline polymers in step a) can be obtained by using $C_2$ symmetric, Cs symmetric, $C_1$ symmetric metallocene compounds as described in *Chem. Rev.* 2000, 100, 1253 1345. Additionally semicrystalline polymers can be obtained by means of $C_1$-like symmetric metallocene compounds. The term "$C_1$-like symmetric" means that the bulkier substituents of the two cyclopentadienyl moieties on the metallocene compound are on the opposite side with respect to the plane containing the zirconium and the centre of the said cyclopentadienyl moieties as shown in the following compound:

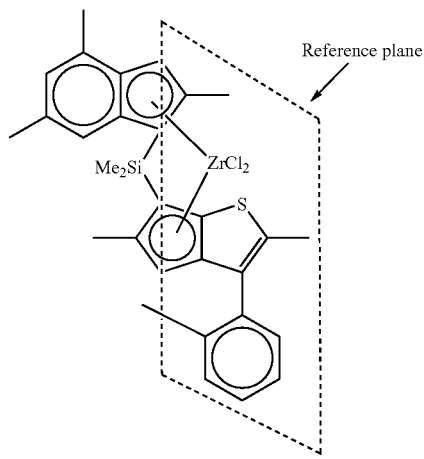

Other suitable metallocene compounds are described in EP938491, WO01/47939, W001/44318 and WO03045964.

The amorphous polymer component of step b) can be obtained for example according to the metallocene catalyst system disclosed in patent applications EP 04104350.6 and EP 04104351.4.

The alumoxanes able to form an alkylmetallocene cation are considered to be linear, branched or cyclic compounds containing at least one group of the type:

wherein the substituents U, same or different, are defined above.

In particular, alumoxanes of the formula:

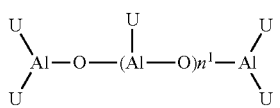

can be used in the case of linear compounds, wherein $n^1$ is 0 or an integer of from 1 to 40 and the substituents U are defined as above; or alumoxanes of the formula:

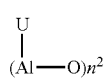

can be used in the case of cyclic compounds, wherein $n^2$ is an integer from 2 to 40 and the U substituents are defined as above.

Examples of alumoxanes suitable for use according to the present invention are methylalumoxane (MAO), tetra-(isobutyl)alumoxane (TIBAO), tetra-(2,4,4-trimethylpentyl)alumoxane (TIOAO), tetra-(2,3-dimethylbutyl)alumoxane (TDMBAO) and tetra-(2,3,3-trimethylbutyl)alumoxane (TTMBAO).

Particularly interesting cocatalysts are those described in WO 99/21899 and in WO01/21674 in which the alkyl and aryl groups have specific branched patterns.

Non-limiting examples of aluminium compounds that can be reacted with water to give suitable alumoxanes (b), described in WO 99/21899 and WO01/21674, are:

tris(2,3,3-trimethyl-butyl)aluminium, tris(2,3-dimethyl-hexyl)aluminium, tris(2,3-dimethylbutyl)aluminium, tris(2,3-dimethyl-pentyl)aluminium, tris(2,3-dimethyl-heptyl)aluminium, tris(2-methyl-3-ethyl-pentyl)aluminium, tris(2-methyl-3-ethyl-hexyl)aluminium, tris(2-methyl-3-ethyl-heptyl)aluminium, tris(2-methyl-3-propyl-hexyl)aluminium, tris(2-ethyl-3-methylbutyl)aluminium, tris(2-ethyl-3-methyl-pentyl)aluminium, tris(2,3-diethyl-pentyl)aluminium, tris(2-propyl-3-methyl-butyl)aluminium, tris(2-isopropyl-3-methyl-butyl)aluminium, tris(2-isobutyl-3-methyl-pentyl)aluminium, tris(2,3,3-trimethyl-pentyl)aluminium, tris(2,3,3-trimethyl-hexyl)aluminum, tris(2-ethyl-3,3-dimethyl-butyl)aluminium, tris(2-ethyl-3,3-dimethyl-pentyl)aluminium, tris(2-isopropyl-3,3-dimethyl-butyl)aluminium, tris(2-trimethylsilyl-propyl)aluminium, tris(2-methyl-3-phenyl-butyl)aluminium, tris(2-ethyl-3-phenyl-butyl)aluminium, tris(2,3-dimethyl-3-phenyl-butyl)aluminium, tris(2-phenyl-propyl)aluminium, tris[2-(4-fluorophenyl)-propyl]aluminium, tris[2-(4-chloro-phenyl)propyl] aluminium, tris[2-(3-isopropyl-phenyl)-propyl]aluminium, tris(2-phenyl-butyl)aluminium, tris(3-methyl-2-phenyl-butyl)aluminium, tris(2-phenyl-pentyl)aluminium, tris[2-(pentafluorophenyl)-propyl]aluminium, tris[2,2-diphenyl-ethyl] aluminium and tris[2-phenyl-2-methyl-propyl]aluminium, as well as the corresponding compounds wherein one of the hydrocarbyl groups is replaced with a hydrogen atom, and those wherein one or two of the hydrocarbyl groups are replaced with an isobutyl group.

Amongst the above aluminium compounds, trimethylaluminium (TMA), triisobutylaluminium (TIBA), tris(2,4,4-trimethyl-pentyl)aluminium (TIOA), tris(2,3-dimethylbutyl)aluminium (TDMBA) and tris(2,3,3-trimethylbutyl)aluminium (TTMBA) are preferred.

Non-limiting examples of compounds able to form an alkylmetallocene cation are compounds of formula $D^+E^-$, wherein $D^+$ is a Brønsted acid, able to donate a proton and to react irreversibly with a substituent X of the metallocene of formula (I) and $E^-$ is a compatible anion, which is able to stabilize the active catalytic species originating from the reaction of the two compounds, and which is sufficiently labile to be removed by an olefinic monomer. Preferably, the anion $E^-$ comprises one or more boron atoms. More preferably, the anion $E^-$ is an anion of the formula $BAr_4^{(-)}$, wherein the substituents Ar which can be identical or different are aryl radicals such as phenyl, pentafluorophenyl or bis(trifluoromethyl)phenyl. Tetrakis-pentafluorophenyl borate is particularly preferred compound, as described in WO 91/02012. Moreover, compounds of formula $BAr_3$ can be conveniently used. Compounds of this type are described, for example, in the International patent application WO 92/00333. Other examples of compounds able to form an alkylmetallocene cation are compounds of formula $BAr_3P$ wherein P is a substituted or unsubstituted pyrrol radical. These compounds are described in WO01/62764. Compounds containing boron atoms can be conveniently supported according to the description of DE-A-19962814 and DE-A-19962910. All these compounds containing boron atoms can be used in a molar ratio between boron and the metal of the metallocene comprised between about 1:1 and about 10:1; preferably 1:1 and 2.1; more preferably about 1:1.

Non limiting examples of compounds of formula $D^+E^-$ are:
Tributylammoniumtetra(pentafluorophenyl)aluminate,
Tributylammoniumtetra(trifluoromethylphenyl)borate,
Tributylammoniumtetra(4-fluorophenyl)borate,
N,N-Dimethylbenzylammonium-tetrakispentafluorophenylborate,
N,N-Dimethylhexylamonium-tetrakispentafluorophenylborate,
N,N-Dimethylaniliniumtetrakis(pentafluorophenyl)borate,
N,N-Dimethylaniliniumtetrakis(pentafluorophenyl)aluminate,
N,N-Dimethylbenzylammonium-tetrakispentafluorophenylborate,
N,N-Dimethylhexylamonium-tetrakispentafluorophenylborate,
Di(propyl)ammoniumtetrakis(pentafluorophenyl)borate,
Di(cyclohexyl)ammoniumtetrakis(pentafluorophenyl)borate,
Triphenylcarbeniumtetrakis(pentafluorophenyl)borate,
Triphenylcarbeniumtetrakis(pentafluorophenyl)aluminate,
Ferroceniumtetrakis(pentafluorophenyl)borate,
Ferroceniumtetrakis(pentafluorophenyl)aluminate.
Triphenylcarbeniumtetrakis(pentafluorophenyl)borate, and
N,N-Dimethylaniliniumtetrakis(pentafluorophenyl)borate.

Additional examples of compounds of formula $D+E^-$ that can be used according to the present invention are described in WO 04/005360, WO 02/102811 and WO 01/62764.

The following examples have to be considered representative and non-limiting of the scope of the invention.

EXAMPLES

Characterization

The fusion enthalpy ($\Delta H$) of the polyolefin components were measured by Differential Scanning Calorimetry (D.S.C.) on a Perkin Elmer DSC-7 instrument, according to the standard method. A weighted sample (5-7 mg) obtained from the polymerization was sealed into aluminum pans and heated to 180° C. at 10° C./minute. The sample was kept at 180° C. for 5 minutes to allow a complete melting of all the crystallites, then cooled to 20° C. at 10° C./minute. After standing 2 minutes at 20° C., the sample was heated for the second time to 180° C. at 10° C./min. In this second heating run, the peak temperature was taken as the melting temperature ($T_m$) and the area of the peak as fusion enthalpy ($\Delta H$).

The intrinsic viscosity (IV) of the polyolefin components was measured in tetrahydronaphtalene (THN) at 135° C.

The solubility index (X.S.) of the polyolefin components was measured in xylene at 0° C.

Preparation of the Catalyst System

A metallocene-based catalyst system was used to carry out the polymerization steps a) and b) of the present invention.

Rac dimethylsilyl{(2,4,7-trimethyl-1-indenyl)-7-(2,5-dimethyl-cyclopenta[1,2-b:4,3-b']-dithiophene)}zirconium dimethyl (A-1) was used as the metallocene compound, prepared according to the procedure described in patent application WO 05/095468.

The cocatalyst methylalumoxane (MAO) was a commercial product which was used as received (Witco AG, 10% wt/vol toluene solution, 1.7 M in Al). The catalyst mixture was prepared by dissolving the desired amount of the above metallocene compound with the proper amount of the MAO solution, (Al/Zr ratio=500) obtaining a solution which was stirred for 10 min at room temperature.

Example 1

This example was carried out in a pilot plant to prepare a polybutene/polyhexene blend according to the embodiment of FIG. 1 of the present invention.
Polymerization Step a)

A semicrystalline poly-1-butene component was prepared in the presence of the above metallocene-based catalyst system in a continuously stirred tank reactor having a volume of 0.33 m$^3$. Liquid butene-1 together with H$_2$ as a molecular weight regulator were continuously fed to the polymerization reactor 1 as shown in FIG. 1. The polymerization conditions are reported in Table 1.

TABLE 1

| Polymerization conditions | Step a) |
| --- | --- |
| Temperature (° C.) | 75° C. |
| Pressure (bar) | 22 |
| Residence Time (min) | 130 |
| H$_2$/C$_4$H$_8$ (ppm weight) | 20 |

A solution of PB-1 in butene-1 with a concentration of 25% by weight was continuously withdrawn from the reactor 1 at a flow rate of 60 kg/h. A sample of polymeric solution was taken at the outlet of the reactor in order to evaluate the fusion enthalpy (ΔH) and the intrinsic viscosity (IV) of the obtained polybutene-1: a ΔH of 30 J/g and an IV of 1.5 dl/g were measured.
Polymerization Step b)

An amorphous polyolefin component was prepared in a continuously stirred tank reactor having a volume of 0.33 m$^3$ connected in parallel with the reactor of step a). Liquid 1-hexene together with H$_2$ as a molecular weight regulator were continuously fed to the polymerization reactor 2 of FIG. 1. The polymerization conditions are reported in Table 2.

TABLE 2

| Polymerization conditions | Step b) |
| --- | --- |
| Temperature (° C.) | 55° C. |
| Pressure (bar) | 15 |
| Residence Time (min) | 130 |
| H$_2$/C$_6$H$_{12}$ (ppm weight) | 20 |

A solution of poly-1-hexene in 1-hexene with a concentration of 27% by weight was continuously withdrawn from the reactor 2 at a flow rate of 50 kg/h. A sample of polymeric solution was taken at the outlet of the reactor in order to evaluate the intrinsic viscosity (IV) and the solubility in xylene: the component was completely soluble in xylene at 0° C., while the IV was of 1.2 dl/g.
Steps c) and d)

The polymeric solutions discharged from the stirred tank reactors 1 and 2 are then transferred, respectively via lines 15 and 16 to the mixer 17 for carrying out the mixing step c).

A homogeneous mixture of the two polymeric solutions is withdrawn from the mixer 17 by means of the gear pump 19 and conveyed via line 20 to the multi-tube heat exchanger 21. The delivery pressure downstream the gear pump 19 was of 30 bar. The length of the multi-tube heat exchanger was 1.2 m, the number of tubes was 60, the diameter thereof was 20 mm. Mixing rods were used as mixing elements inside each tube.

A diathermic oil (MARLOTHERM N) was fed at 270° C. into the heat exchanger as a heating fluid. The operative conditions at the outlet of the multi-tube heat exchanger 21 were the following: T=225° C., p=5 bar. The same operative conditions were adopted in the first volatilizer 23 wherein the above mixture was introduced: due to the gravity, the polymer melt was collected at the bottom of the chamber, while gaseous 1-butene and 1-hexene flowed upward. At the outlet of this volatilizer the content of monomers in the polymer melt was checked: a value of 3.0% by weight was measured.

The polymer melt was withdrawn from the bottom of the first volatilizer 23 by means of a gear pump and then introduced into a second multi-tube heat exchanger 27 wherein the polymer melt was heated up to the temperature requested into the second volatilizer 28.

The second volatilizer 28 was operated under vacuum at 210° C. and 20 mbar. At the outlet of this second volatilizer the content of monomers in the polymer melt was measured obtaining a value of only 670 ppm weight.

The polyolefin blend in the molten form discharged from the volatilizer 28 had the following composition:
61% by wt of poly-1-butene
39% by wt of poly-1-hexene A static mixer 32 placed downstream the volatilizer 28 was used to mix the polyolefin blend with Irganox 1010 as an antioxidant compound, talc as a nucleating agent, carbon black and TiO$_2$ as pigments. A side-arm extruder was used to melt and convey the additives into the static mixer. Finally, the additivated polyolefin blend exiting the static mixer was conveyed to an underwater pelletizer to be cut into pellets.

Example 2

Figure 2:
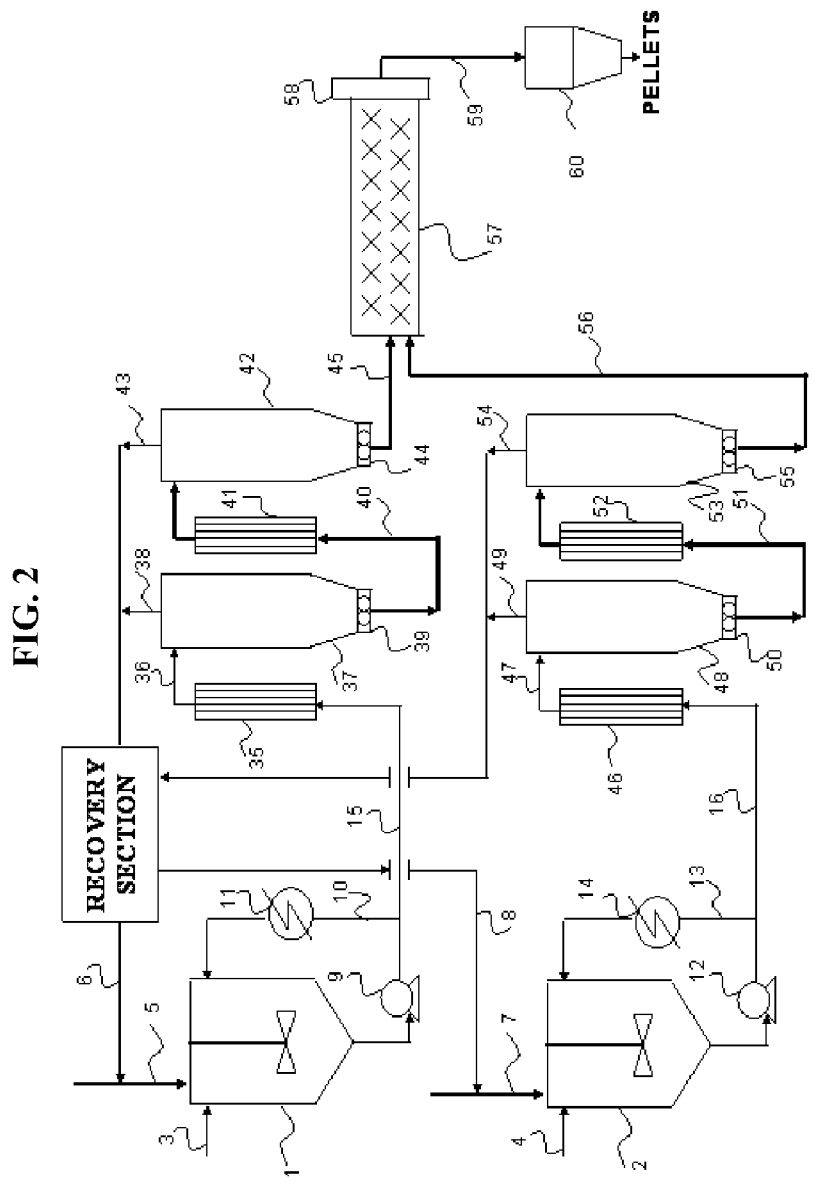

This example was carried out in a pilot plant to prepare a polybutene/polyhexene blend according to the embodiment of FIG. 2 of the present invention.
Polymerization Step a)

A semicrystalline poly-1-butene component was prepared according to the same operative conditions described in step a) of Example 1 by means of the same metallocene-based catalyst system.

A solution of PB-1 in butene-1 with a concentration of 25% by weight was continuously withdrawn from the reactor 1 at a flow rate of 60 kg/h. A sample of polymeric solution was taken at the outlet of the reactor in order to evaluate the fusion enthalpy (ΔH) and the intrinsic viscosity (IV) of the obtained polybutene-1: a ΔH of 30 J/g and a IV of 1.5 dl/g were measured.
Polymerization Step b)

An amorphous polyolefin component was prepared by means of the same metallocene-based catalyst system of Example 1 in a tank reactor 2 connected in parallel with the reactor of step a). The same operative conditions described in step b) of Example 1 were adopted.

A solution of poly-1-hexene in 1-hexene with a concentration of 27% by weight was continuously withdrawn from the reactor 2 at a flow rate of 50 kg/h. A sample of polymeric solution was taken at the outlet of the reactor in order to evaluate the intrinsic viscosity (IV) and the solubility inn xylene: the component was completely soluble in xylene at 0° C., while the IV was of 1.2 d/g.
Step E)

The solution of PB-1 in 1-butene was discharged from the stirred tank reactor 1, pressurized by means of the gear pump 9, and conveyed via line 15 to the multi-tube heat exchanger 35. The pressure at the inlet of the heat exchanger 35 was of 27 bar.

A diathermic oil (MARLOTHERM N) was fed at 260° C. into the heat exchanger as a heating fluid. The operative conditions at the outlet of the multi-tube heat exchanger 35 were the following: T=210° C., p=7 bar. The same operative conditions were adopted in the first volatilizer 37 wherein the above mixture was introduced: due to the gravity, the polymer melt was collected at the bottom of the volatilizer, while gaseous 1-butene flowed upward. At the outlet of this volatilizer the content of 1-butene in the polymer melt was checked: a value of 2.1% by weight was measured.

The polymer melt was withdrawn from the bottom of the first volatilizer 37 by means of a gear pump and then introduced into a second multi-tube heat exchanger 41, wherein the polymer melt was heated up to the temperature requested into the second volatilizer 42. The second volatilizer 42 was operated under vacuum at 210° C. and 25 mbar. At the outlet of this second volatilizer the content of monomers in the polymer melt was measured obtaining a value of only 267 ppm weight.

Step F)

The solution of poly-1-hexene in 1-hexene was discharged from the stirred tank reactor 2, pressurized by means of the gear pump 12, and conveyed via line 16 to the multi-tube heat exchanger 46. The pressure at the inlet of the heat exchanger 35 was of 30 bar.

A diathermic oil (MARLOTHERM N) was fed at 260° C. into the heat exchanger as a heating fluid. The operative conditions at the outlet of the multi-tube heat exchanger 46 were the following: T=225° C., p=4 bar. The same operative conditions were adopted in the first volatilizer 48 wherein the above mixture was introduced: due to the gravity, the polymer melt was collected at the bottom of the volatilizer, while gaseous 1-hexene flowed upward. At the outlet of this volatilizer the content of 1-hexene in the polymer melt was checked: a value of 2.8% by weight was measured.

The polymer melt was withdrawn from the bottom of the first volatilizer 48 by means of a gear pump and then introduced into a second multi-tube heat exchanger 52, wherein the polymer melt was heated up to the temperature requested into the second volatilizer 53. The second volatilizer 53 was operated under vacuum at 210° C. and 15 mbar. At the outlet of this second volatilizer the content of monomers in the polymer melt was measured obtaining a value of only 520 ppm weight.

Step G)

A polymer melt consisting of poly-1-butene and a polymer melt consisting of poly-1-hexene are conveyed, respectively via line 45 and line 56, to a static mixer compounder 57 having the function of carrying out the mixing stage G). A polyolefin blend containing a semicrystalline component and an amorphous component is therefore withdrawn, in the form of a polymer melt, from the die plate 58 of the static mixer compounder. The polyolefin blend is then transferred via line 59 to an underwater pelletizer 60, where polyolefin pellets are formed. The pellets obtained from the pelletizer 60 had the following composition:

64% by wt of poly-1-butene
36% by wt of poly-1-hexene

The invention claimed is:

1. A process for preparing polyolefin blends comprising:
polymerizing in a solution phase propylene or 1-butene, optionally in presence of α-olefin comonomers of formula $CH_2$=CHR, wherein R is hydrogen or a hydrocarbon radical comprising 1-8 carbon atoms, to prepare a polymeric solution comprising a semicrystalline polymer component;
polymerizing in a solution phase 1-hexene or 1-octene, optionally in presence of α-olefin comonomers of formula $CH_2$=CHR, wherein R is hydrogen or a hydrocarbon radical comprising 1-8 carbon atoms, the α-olefin being present in an amount up to 50% by weight based on the 1-hexene or 1-octene, to prepare a polymeric solution comprising a completely amorphous polymer component;
mixing the polymeric solution comprising the semicrystalline polymer component and the polymeric solution comprising the completely amorphous polymer component to form a mixture; and
subjecting the mixture to a devolatilization, step to separate a polyolefin blend comprising the semicrystalline component and the amorphous component from volatile components;
wherein the polymeric solution comprising the semicrystalline polymer component and the polymeric solution comprising the completely amorphous component are simultaneously prepared in two polymerization reactors connected in parallel, and then respectively transferred from each reactor to the mixing step.

2. The process according to claim 1, wherein the polymeric solution comprising the semicrystalline polymer component, and the polymeric solution comprising the completely amorphous polymer component are prepared in the presence of a polymerization catalyst selected from a Ziegler-Natta or a single-site based catalyst system.

3. The process according to claim 1, wherein the polymeric solution comprising the semicrystalline polymer component, and the polymeric solution comprising the completely amorphous polymer component are prepared in reaction vessels selected from continuously stirred tank reactors and static mixer reactors (SMR).

4. The process of claim 3 wherein the a polymeric solution comprising the semicrystalline polymer component is produced by polymerizing 1-butene to form a homopolymer of 1-butene or a copolymer of 1-butene with an α-olefin selected from ethylene, propylene or 1-hexene where the α-olefin is present in an amount up to 15% by weight.

5. The process of claim 4 wherein 1-butene is polymerized to form a homopolymer of 1-butene.

6. The process of claim 5 wherein the polymeric solution comprising the completely amorphous polymer component is produced by polymerizing 1-hexene or 1-octene to form a homopolymer of 1-hexene or homopolymer of 1-octene.

7. The process according to claim 1, wherein the 1-butene of the polymeric solution comprising the semicrystalline polymer component is prepared in liquid monomer at a temperature from 65 to 85° C.

8. The process according to claim 7, further comprising a pressure between 8 and 40 bar.

9. The process according to claim 1, wherein the propylene of the polymeric solution comprising the semicrystalline polymer component is prepared in liquid monomer in presence of a polymerization solvent selected from toluene, cyclohexane, hexane, heptane, octane, nonane, isooctane, ethylbenzene, isopentane, and mixtures thereof.

10. The process according to claim 9, further comprising a polymerization temperature from 80 to 200° C., and a pressure from 15 to 100 bar.

11. The process according to claim 1, wherein the 1-hexene or 1-octene of the polymeric solution comprising the completely amorphous polymer component is prepared in liquid monomer at a temperature from 20° C. to 80° C.

12. The process according to claim 1, wherein mixing the polymeric solution comprising the semicrystalline polymer component and the polymeric solution comprising the completely amorphous polymer component is performed in a mixing apparatus comprising at least one stirring devices, or in a static mixer.

13. The process according to claim 1, further comprising heating the polymeric solution comprising the semicrystalline polymer component and the polymeric solution comprising the completely amorphous polymer component in a heat exchanger to a temperature between 180 and 300° C.

14. The process according to claim 1, wherein the devolatilization step is carried out in a sequence of a first and a second volatilizer operating at a decreasing pressure.

15. The process according to claim 14, wherein the first volatilizer is operated at a temperature of 180-300° C., and a pressure of 1-15 bar.

16. The process according to claim 14, wherein the second volatilizer is operated at a temperature of 180-300° C., and a pressure of 5-100 mbar.

17. A process for preparing polyolefin blends comprising:
polymerizing in a solution phase propylene or 1-butene, optionally in presence of α-olefin comonomers of formula $CH_2=CHR$, wherein R is hydrogen or a hydrocarbon radical comprising 1-8 carbon atoms, to prepare a polymeric solution comprising a semicrystalline polymer component;
polymerizing in a solution phase 1-hexene or 1-octene, optionally in presence of α-olefin comonomers of formula $CH_2=CHR$, wherein R is hydrogen or a hydrocarbon radical comprising 1-8 carbon atoms atoms, the α-olefin being present in an amount up to 50% by weight based on the 1-hexene or 1-octene, to prepare a polymeric solution comprising a completely amorphous polymer component;
mixing the polymeric solution comprising the semicrystalline polymer component and the polymeric solution comprising the completely amorphous polymer component to form a mixture; and
subjecting the mixture to a devolatilization step to separate a polyolefin blend comprising the semicrystalline component and the completely amorphous component from volatile components;
wherein the polymeric solution comprising the semicrystalline polymer component and the polymeric solution comprising the completely amorphous component are prepared in two polymerization reactors connected in parallel, and then respectively transferred from each reactor to the mixing step.

18. The process of claim 17 wherein the a polymeric solution comprising the semicrystalline polymer component is produced by polymerizing 1-butene to form a homopolymer of 1-butene or a copolymer of 1-butene with an α-olefin selected from ethylene, propylene or 1-hexene where the α-olefin is present in an amount up to 15% by weight.

19. The process of claim 18 wherein 1-butene is polymerized to form a homopolymer of 1-butene.

20. The process of claim 19 wherein the polymeric solution comprising the completely amorphous polymer component is produced by polymerizing 1-hexene or 1-octene to form a homopolymer of 1-hexene or homopolymer of 1-octene.

* * * * *